US012330176B2

(12) United States Patent
Knight

(10) Patent No.: US 12,330,176 B2
(45) Date of Patent: Jun. 17, 2025

(54) MODULAR, ADJUSTABLE FORCE, ALL-POLYMER HELICAL BIASING MEMBER AND PUMP DISPENSER INCORPORATING SAME

(71) Applicant: RIEKE PACKAGING SYSTEMS LIMITED, Leicestershire (GB)

(72) Inventor: Simon Christopher Knight, Bridgend (GB)

(73) Assignee: RIEKE PACKAGING SYSTEMS LIMITED, Leicestershire (GB)

(*) Notice: Subject to any disclaimer, the term of this patent is extended or adjusted under 35 U.S.C. 154(b) by 312 days.

(21) Appl. No.: 18/022,031

(22) PCT Filed: Aug. 18, 2021

(86) PCT No.: PCT/EP2021/072961
§ 371 (c)(1),
(2) Date: Feb. 17, 2023

(87) PCT Pub. No.: WO2022/038194
PCT Pub. Date: Feb. 24, 2022

(65) Prior Publication Data
US 2023/0347368 A1 Nov. 2, 2023

Related U.S. Application Data

(60) Provisional application No. 63/067,057, filed on Aug. 18, 2020.

(51) Int. Cl.
*B05B 11/10* (2023.01)

(52) U.S. Cl.
CPC ...... *B05B 11/1077* (2023.01); *B05B 11/1074* (2023.01)

(58) Field of Classification Search
CPC ............. B05B 11/1077; B05B 11/1074; B05B 11/1023; B05B 11/1047
See application file for complete search history.

(56) References Cited

U.S. PATENT DOCUMENTS 5,819,990 A 10/1998 Cimentepe
5,924,603 A * 7/1999 Santagiuliana ..... B05B 11/1023 222/336

(Continued)

FOREIGN PATENT DOCUMENTS

DE 4441263 A1 5/1996
DE 102008023521 A1 9/2009

(Continued)

OTHER PUBLICATIONS

International Search Report mailed Dec. 13, 2021; International Patent Application No. PCT/EP2021/072961 filed on Aug. 18, 2021.

*Primary Examiner* — Bob Zadeh
(74) *Attorney, Agent, or Firm* — McDonald Hopkins LLC

(57) ABSTRACT

A biasing member for use in reciprocating dispenser pumps is contemplated. The member is made completely of polymeric materials and is suitable as a direct replacement for metallic coil springs. The biasing member includes spiral shape defined by inner and outer helix traces, with a series of perforations provided along one or both of those traces. These perforations, in conjunction with thinned channels, the size and shape of holes, and the size and shape of apertures, all cooperate to allow for a spring with sufficient resilience and greater spring force in comparison conventional, all-polymer biasing members.

13 Claims, 14 Drawing Sheets

(56) References Cited

U.S. PATENT DOCUMENTS

| | | | | |
|---|---|---|---|---|
| 6,068,250 | A | 5/2000 | Hawkins | |
| 6,113,082 | A | 9/2000 | Fujino | |
| 6,223,954 | B1 | 5/2001 | Carow | |
| 6,983,924 | B2 | 1/2006 | Howell | |
| 7,770,874 | B2 | 8/2010 | Ophardt | |
| 7,775,405 | B2 | 8/2010 | Dejong | |
| 8,980,153 | B2 | 3/2015 | Falzoni | |
| 8,980,161 | B2 | 3/2015 | Rowley | |
| 9,815,236 | B2 | 11/2017 | Jammet | |
| 9,833,568 | B2 | 12/2017 | Lee | |
| 10,195,936 | B2 | 2/2019 | Fukuyasu | |
| 10,293,538 | B2 | 5/2019 | Porter | |
| 10,369,727 | B2 | 8/2019 | Onodera | |
| 10,451,136 | B2 | 10/2019 | Jerisk | |
| 10,661,493 | B2 | 5/2020 | Onodera | |
| 10,751,740 | B2 | 8/2020 | Passetti | |
| 10,773,269 | B2 * | 9/2020 | DeJong | B05B 11/1077 |
| 2004/0149777 | A1 * | 8/2004 | Santagiuliana | B05B 11/1023 222/190 |
| 2009/0102106 | A1 | 4/2009 | Ohashi | |
| 2012/0325861 | A1 | 12/2012 | Pardonge | |
| 2015/0090741 | A1 | 4/2015 | Laffey | |
| 2017/0157631 | A1 | 6/2017 | Kraus | |
| 2017/0326567 | A1 * | 11/2017 | Santagiuliana | B05B 11/1001 |
| 2019/0076864 | A1 * | 3/2019 | Nilsson | B05B 11/1077 |
| 2019/0368567 | A1 | 12/2019 | Deman | |
| 2020/0032870 | A1 | 1/2020 | Deman | |
| 2020/0215560 | A1 * | 7/2020 | Passetti | B05B 11/0094 |
| 2022/0048058 | A1 | 2/2022 | Göttke | |
| 2023/0311144 | A1 * | 10/2023 | Knight | B05B 11/1077 |
| 2023/0347368 | A1 * | 11/2023 | Knight | B05B 11/1077 |

FOREIGN PATENT DOCUMENTS

| | | | | |
|---|---|---|---|---|
| EP | 0464051 | A4 | 11/1992 | |
| EP | 0691161 | B1 | 9/1999 | |
| EP | 1364719 | A1 | 11/2003 | |
| EP | 3021000 | A1 | 10/2006 | |
| EP | 2975265 | A2 | 9/2012 | |
| FR | 2969241 | B1 | 4/2014 | |
| JP | 2005024100 | A | 1/2005 | |
| JP | 3928747 | B2 | 6/2007 | |
| KR | 20200080209 | A | 7/2020 | |
| KR | 102174715 | B1 | 11/2020 | |
| WO | WO-9420221 | A1 * | 9/1994 | B05B 11/0005 |
| WO | WO-9628257 | A1 * | 9/1996 | B05B 11/1001 |
| WO | 2001087494 | A1 | 11/2001 | |
| WO | WO-2012104694 | A1 * | 8/2012 | B05B 11/0005 |
| WO | 2016079685 | A1 | 5/2016 | |
| WO | 2018126397 | A1 | 7/2018 | |
| WO | 2020156935 | A1 | 8/2020 | |

* cited by examiner

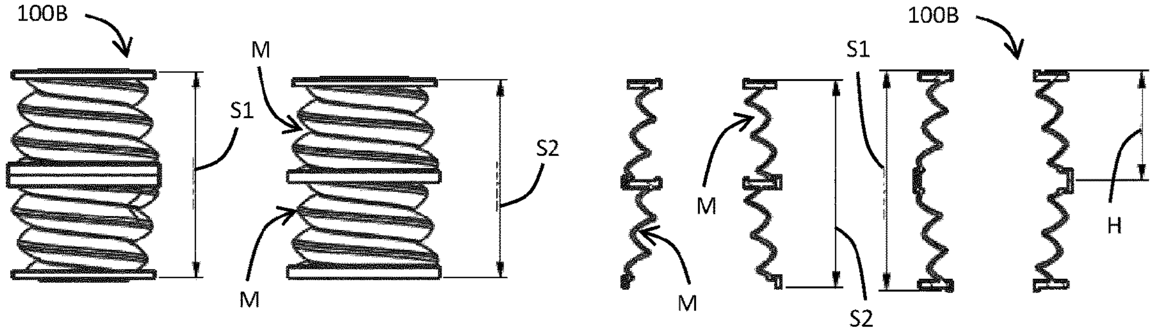
FIGURE 9A
FIGURE 9B
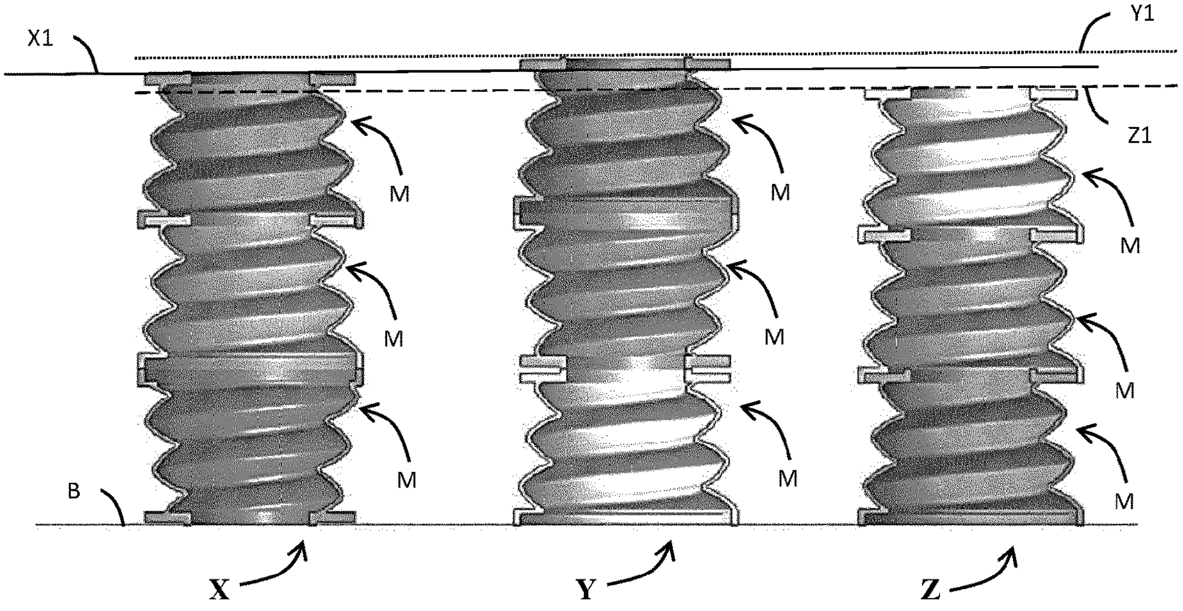
FIGURE 10

MODULAR, ADJUSTABLE FORCE, ALL-POLYMER HELICAL BIASING MEMBER AND PUMP DISPENSER INCORPORATING SAME

CROSS REFERENCE TO RELATED APPLICATIONS AND TECHNICAL FIELD

This application is a 35 U.S.C. § 371 national stage application of PCT Application No. PCT/EP2021/072961 filed on Aug. 18, 2021, which claims priority to U.S. Provisional Patent Application Ser. No. 63/067,057 filed on Aug. 18, 2020. These applications are incorporated by reference, and they relate generally to pump dispensers and, more specifically, to polymeric pump dispensers, made without metallic components, and including a plurality of stacked, helical bellows arranged in configurations that allow for adjust of the axial height and corresponding spring force exerted by the resulting biasing member.

TECHNICAL FIELD

This application relates generally to pump dispensers and, more specifically, to polymeric pump dispensers, made without metallic components, and including a plurality of stacked, helical bellows arranged in configurations that allow for adjust of the axial height and corresponding spring force exerted by the resulting biasing member.

BACKGROUND

Containers for everyday household fluid products, such as soaps, cleaners, oils, consumable liquids, and the like, can be outfitted with dispensing pumps to improve a consumer's ability to access and use the fluid. Dispensing pumps of this type usually rely upon a reciprocating pump, driven by a compressible, metallic biasing member.

These products tend to be single use, thereby giving rise to concerns about sustainability. Increasingly, regulatory authorities are requiring consumer products manufacturers to use product packaging and designs that can easily be recycled. As a practical matter for businesses relying on pump dispensers, it is becoming increasingly important to design products made only from polymeric materials. In this manner, such "all-polymer" pumps can be recycled without the need to disassemble and/or separate out metal parts and components made from difficult to recycle materials (e.g., metallic or foil parts, thermosetting resins, specialized elastomers, and other materials that either cannot be recovered or that require temperatures and conditions for recycling that are incompatible with the materials used in the other parts within the design).

When it comes to creating an all polymer or—more preferably—a single polymer reciprocating pump design, two of the more problematic components are anti-drip nozzles and biasing members. The former are sometimes made from elastomers but, because this is an optional feature, designs can simply eliminate that function or rely on solutions such as those proposed in U.S. Pat. Nos. 8,960,507; 10,252,841; 10,350,620; 10,717,565; and 10,723,528 (all of which are incorporated by reference). The latter tend to be more difficult, as metallic springs provide a cost effective and reliable means of creating the necessary biasing force inherent to operation of reciprocating pumps.

One well known approach is to rely upon a "bellows" style member, such as the ones disclosed in Patent Cooperation Treaty Publication WO 1994/020221A1 and U.S. Pat. Nos. 5,819,990 and 5,924,603 (the latter being incorporated by reference). An accordion- or spiral-shaped bellows serves as or is positioned around the pump stem and biases the pump head away from the closure cap. In some aspects, a protruding stiffening rib and convex sidewalls provide sufficient resilience to improve the reliability and repeatability of the reciprocating force.

Notably, a separate class of bellows-style structures similar to the one shown in United States Patent Publication 2006/0115213A1 are known. However, these "boot joints" differ substantially in structure and function, in that they are designed to confine grease or other viscous substances around the moving parts in automobiles. While these bellows can provide flexibility, they do not serve as biasing members and are not appropriate for use in reciprocating pumps.

Other proposed solutions for non-metallic springs can be found in Japanese Patent Publication 2005024100A; Patent Cooperation Treaty Publications WO 2001/087494A1, 2018/126397A1, and WO 2020/156935A1; French Patent FR2969241B1; Korean Patent KR102174715B1; United States Patent Publications 2009/0102106A1, 2012/0325861A1, 2015/0090741A1, 2017/0157631A1, 2019/0368567A1, and 2020/0032870; and U.S. Pat. Nos. 5,819,990; 6,068,250; 6,113,082; 6,223,954; 6,983,924; 10,741,740; and 10,773,269. Generally speaking, these publications contemplate arrangements where accordions or wire-like plastic strands are provided and arranged to serve as replacements for conventional metallic coil compression springs. However, these arrangements may entail compression or extension configurations that do not serve as direct replacements for the metallic coil compression springs currently used in many reciprocating pump designs. Additionally, some of these structures may entail concerns with respect to manufacturing and longevity.

Yet another challenge with all of these previously known solutions (whether polymeric or metallic) is the configuration of the spring does not lend itself to minor adjustments. That is, the spring force of a coiled metallic spring of a specific diameter and/or the spring force of a bellows or deformable wall polymeric spring can be difficult to adjust without completely altering the dimensions of the spring. In the case of polymeric springs, that adjustment would require changes to the thickness and/or other dimensions, which would necessitate the use of an entirely new mold/manufacturing process. Notably, adjustment of the spring force is important to fine-tuning the function and pumping characteristics of the dispenser itself. Such fine tuning is important when fluids of differing viscosities are intended for dispensing (with more highly viscous fluids requiring different spring force to create suction in comparison to lower viscosity fluids).

In view of the foregoing, a pump dispenser made from polymeric materials that are easy to recycle would be welcome. In addition to a pump design that did not require disassembly and separation of parts into separate recycling streams, a biasing member that allowed for adjustment of the spring force exerted is needed.

DESCRIPTION OF THE DRAWINGS

The appended drawings form part of this specification, and any information on/in the drawings is both literally encompassed (i.e., the actual stated values) and relatively encompassed (e.g., ratios for respective dimensions of parts). In the same manner, the relative positioning and relationship of the components as shown in these drawings, as well as their function, shape, dimensions, and appearance, may all further inform certain aspects of the invention as if fully rewritten herein. Unless otherwise stated, all dimensions in the drawings are with reference to inches, and any printed information on/in the drawings form part of this written disclosure.

In the drawings and attachments, all of which are incorporated as part of this disclosure:

FIG. 9A is a side plan view and FIG. 9B a cross sectional view, both of a "double" stack of modular units. These figures are drawn to scale to illustrate the difference in axial height that can be achieved by the order in which the modular units are stacked.

FIG. 10 is a cross sectional a side plan view of a "triple" stack of modular units. As above, the figure is drawn to scale to illustrate the difference in axial height that can be achieved by the order in which the modular units are stacked.

DESCRIPTION OF INVENTION

Figure 1:
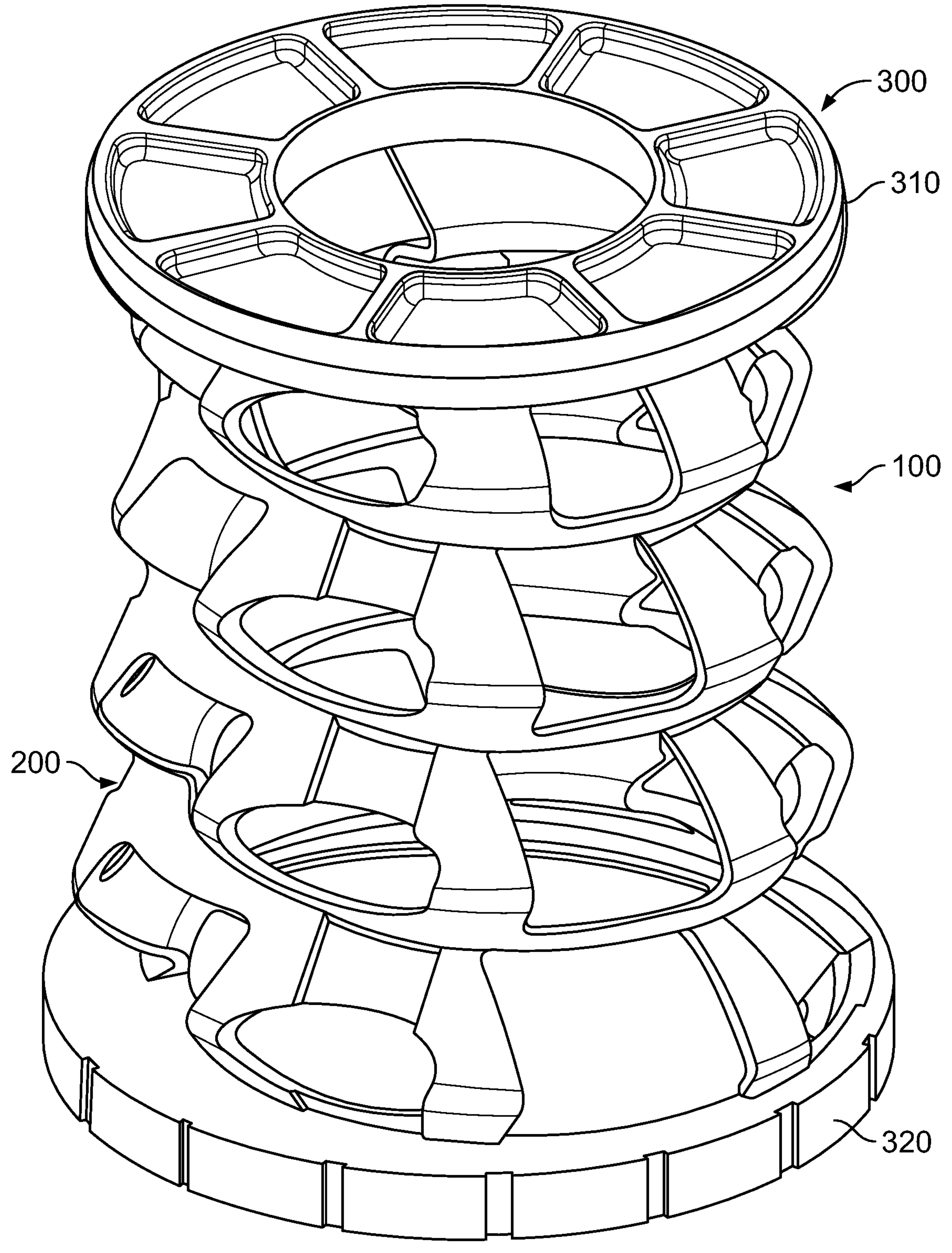
FIG. 1 is a three dimensional perspective view of a biasing member appropriate for use in reciprocating pumps according to certain disclosed aspects herein.
Figure 2A:
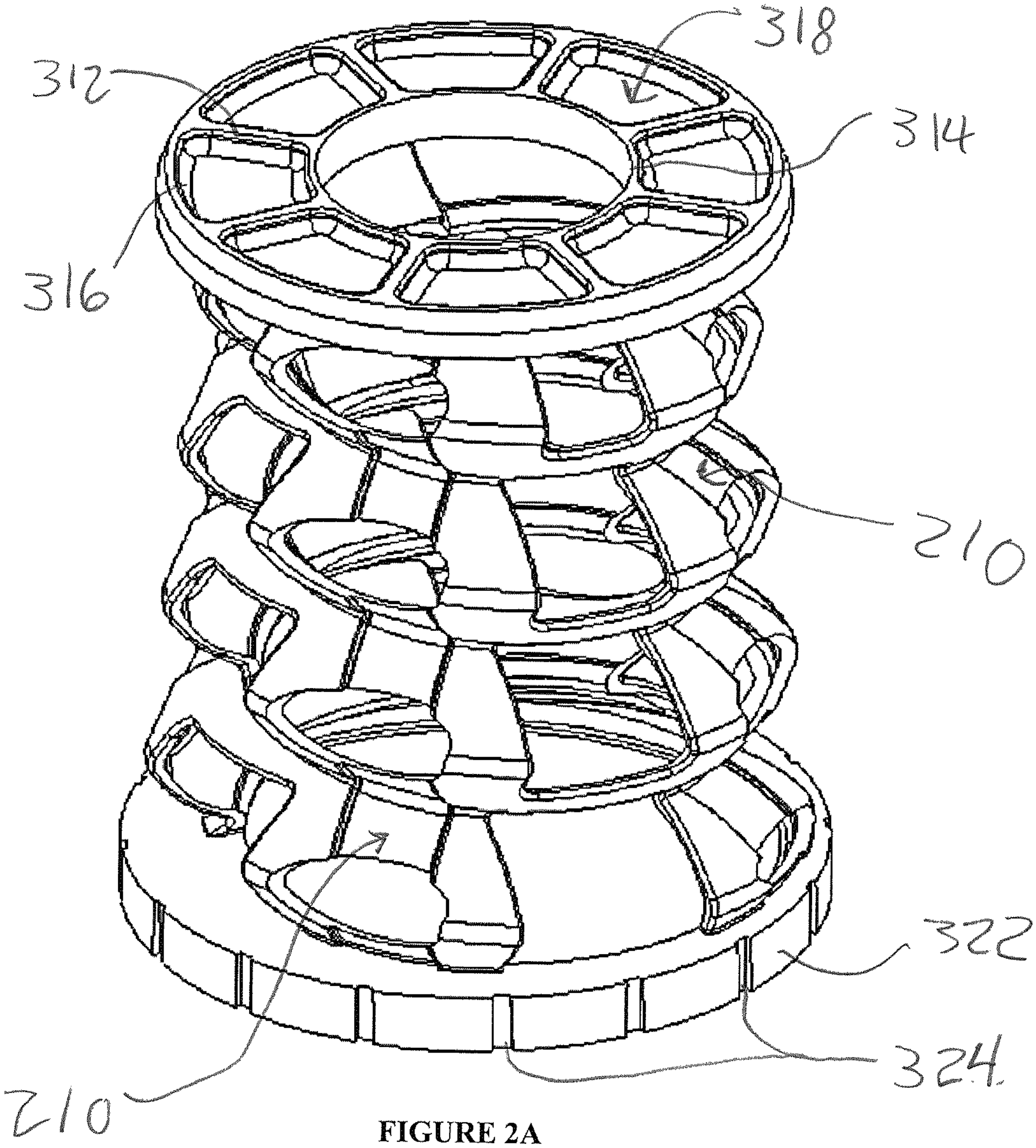
FIG. 2A is a perspective line drawing and FIG. 2B is a line drawing side view, both of the biasing member shown in FIG. 1.
Figure 2B:
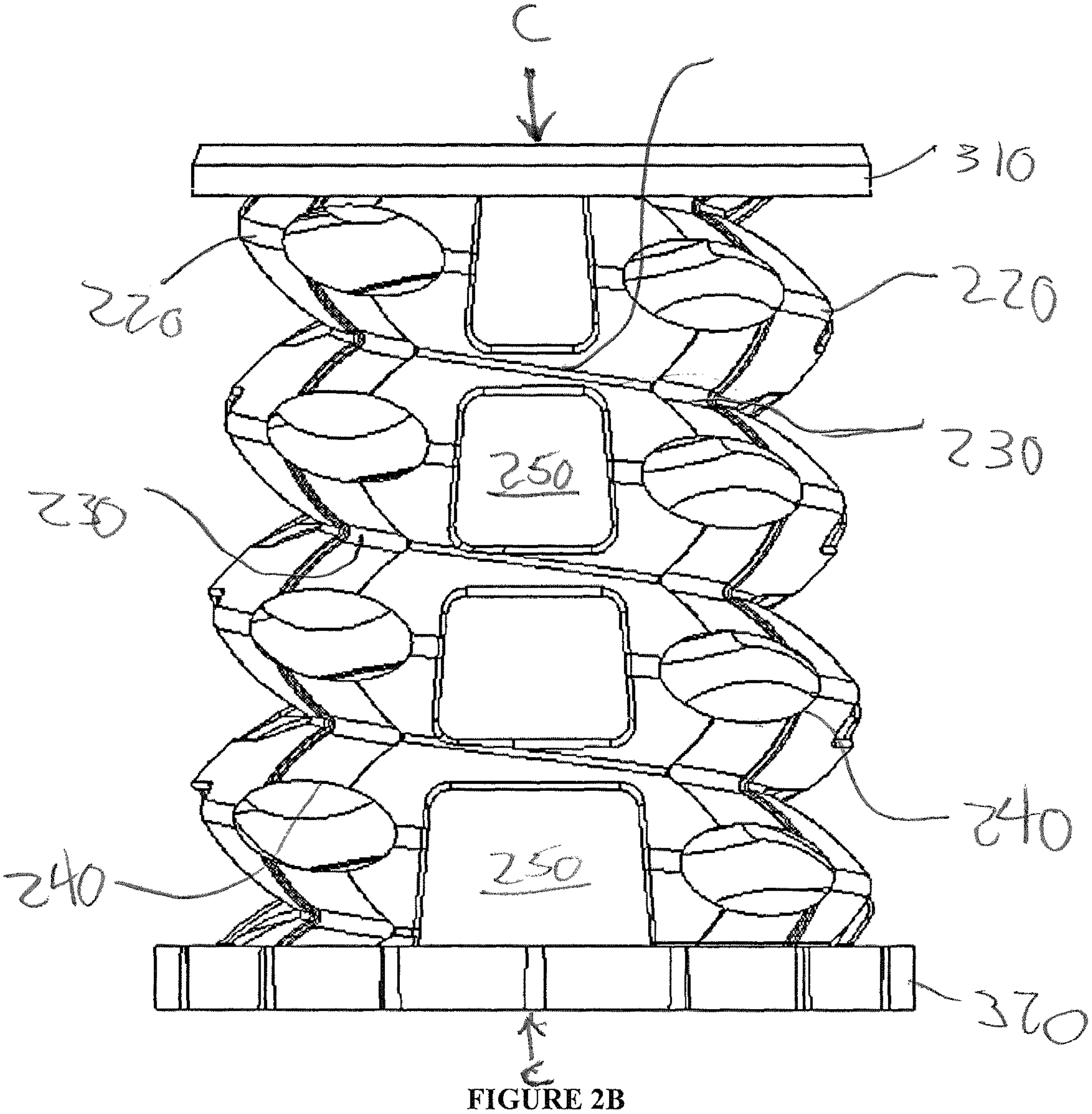
Figure 3A:
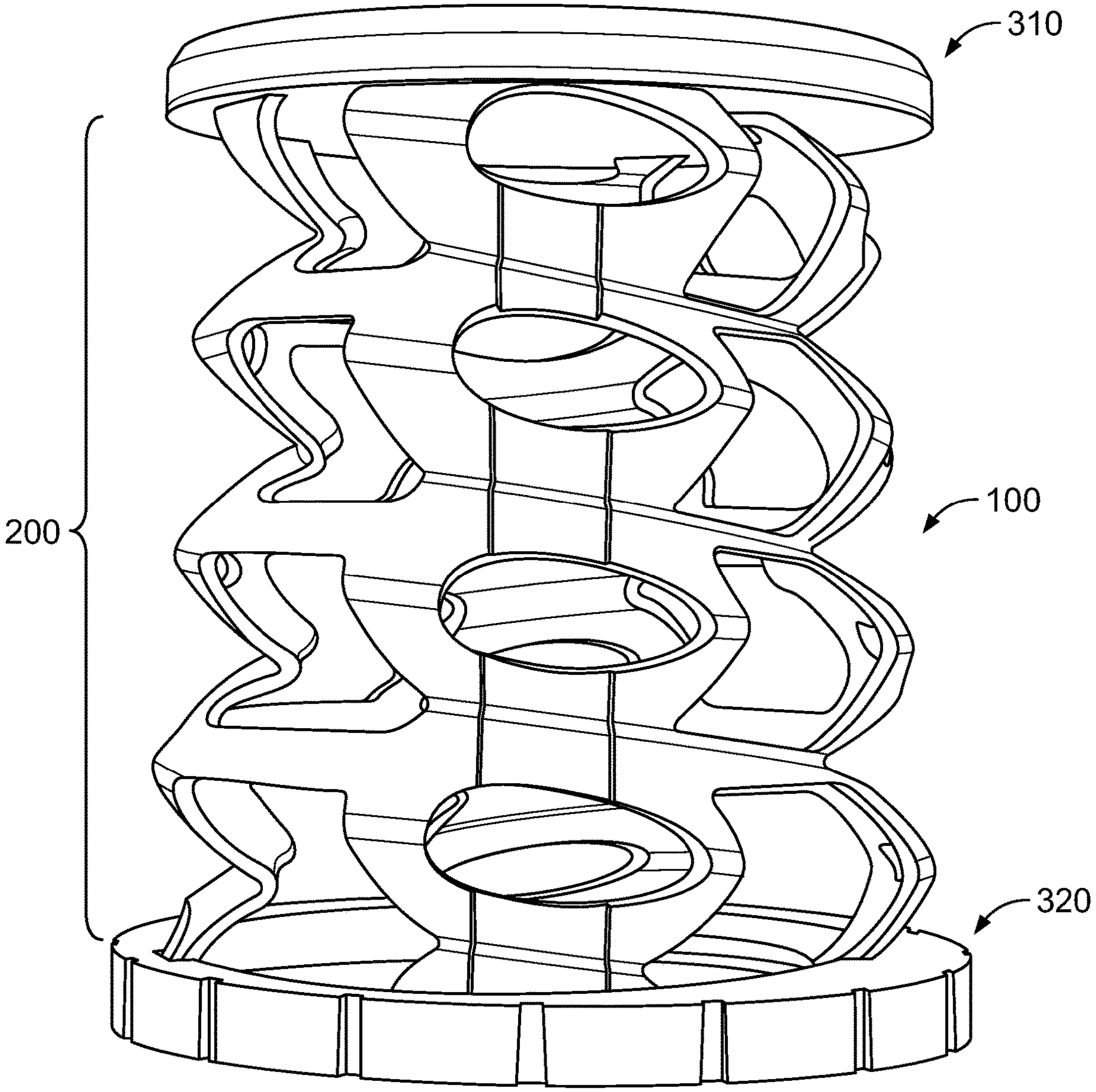
FIG. 3A is a perspective side view of the biasing member of FIG. 1, with FIG. 3B being a perspective cross sectional view taken along a diameter of the biasing member shown in FIG. 3A.
Figure 3B:
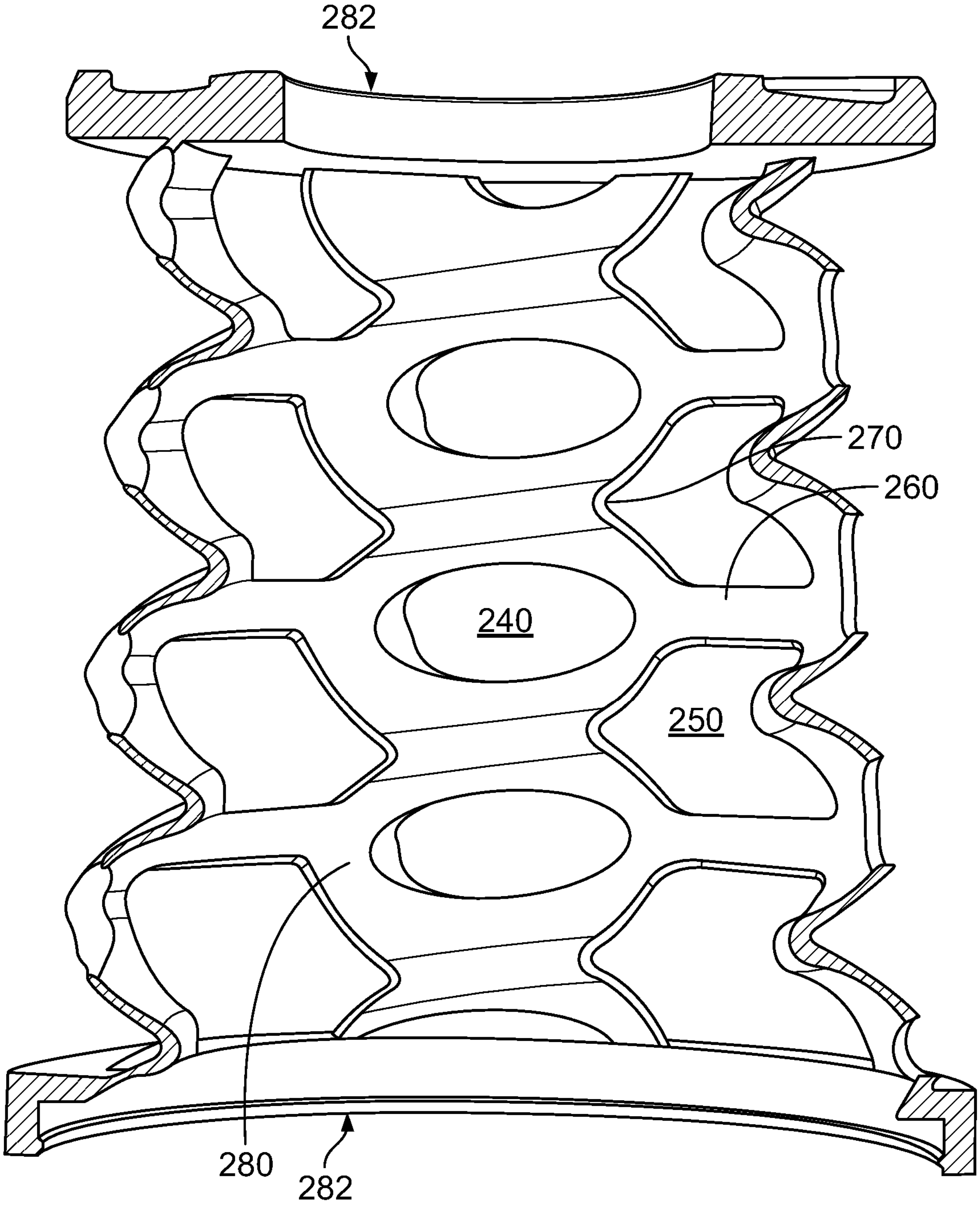
FIG. 3C is a complimentary perspective side view of the biasing member shown in FIG. 3A after having been rotated by 45 degrees about its central axis, with FIG. 3D being a perspective cross sectional view taken along a diameter of the biasing member shown in FIG. 3C.
Figure 3C:
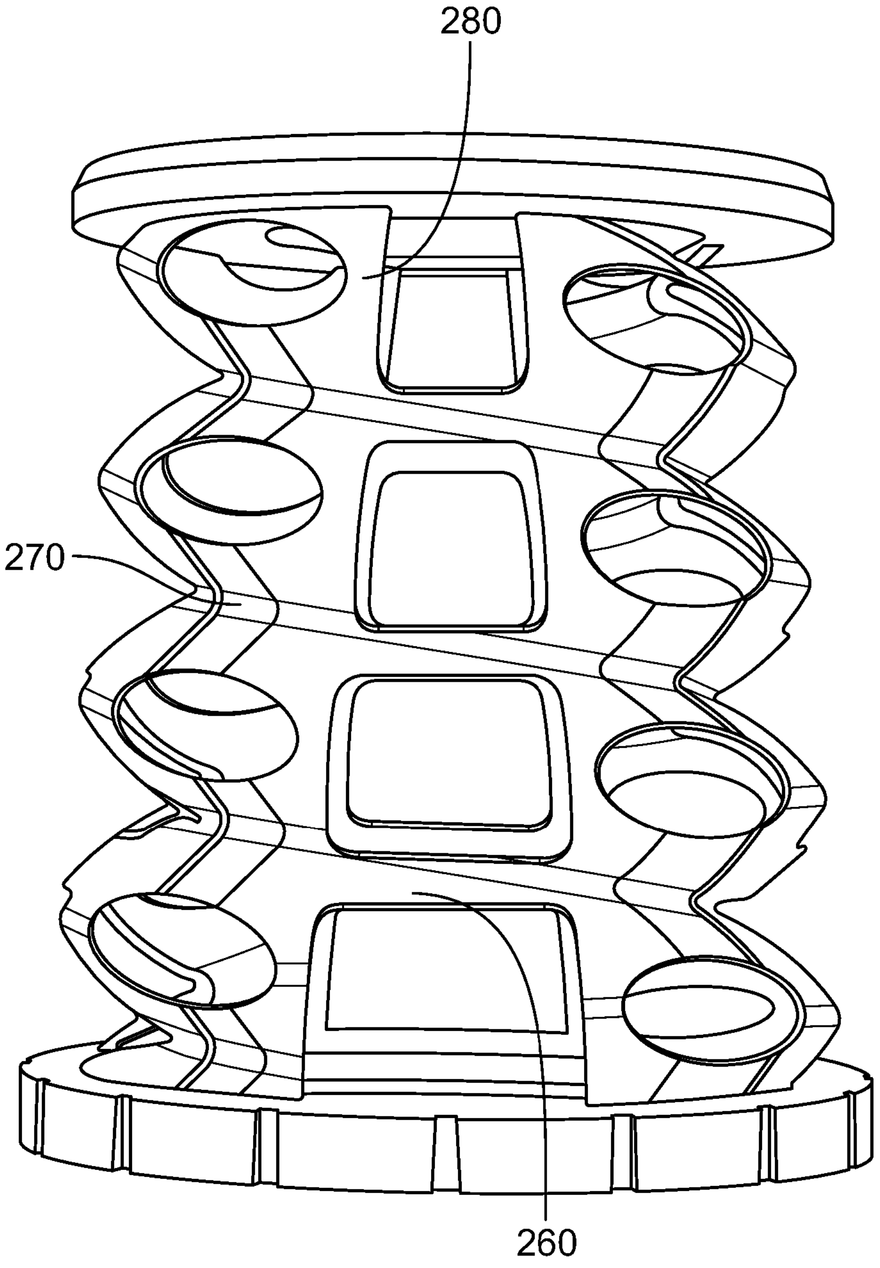
Figure 3D:
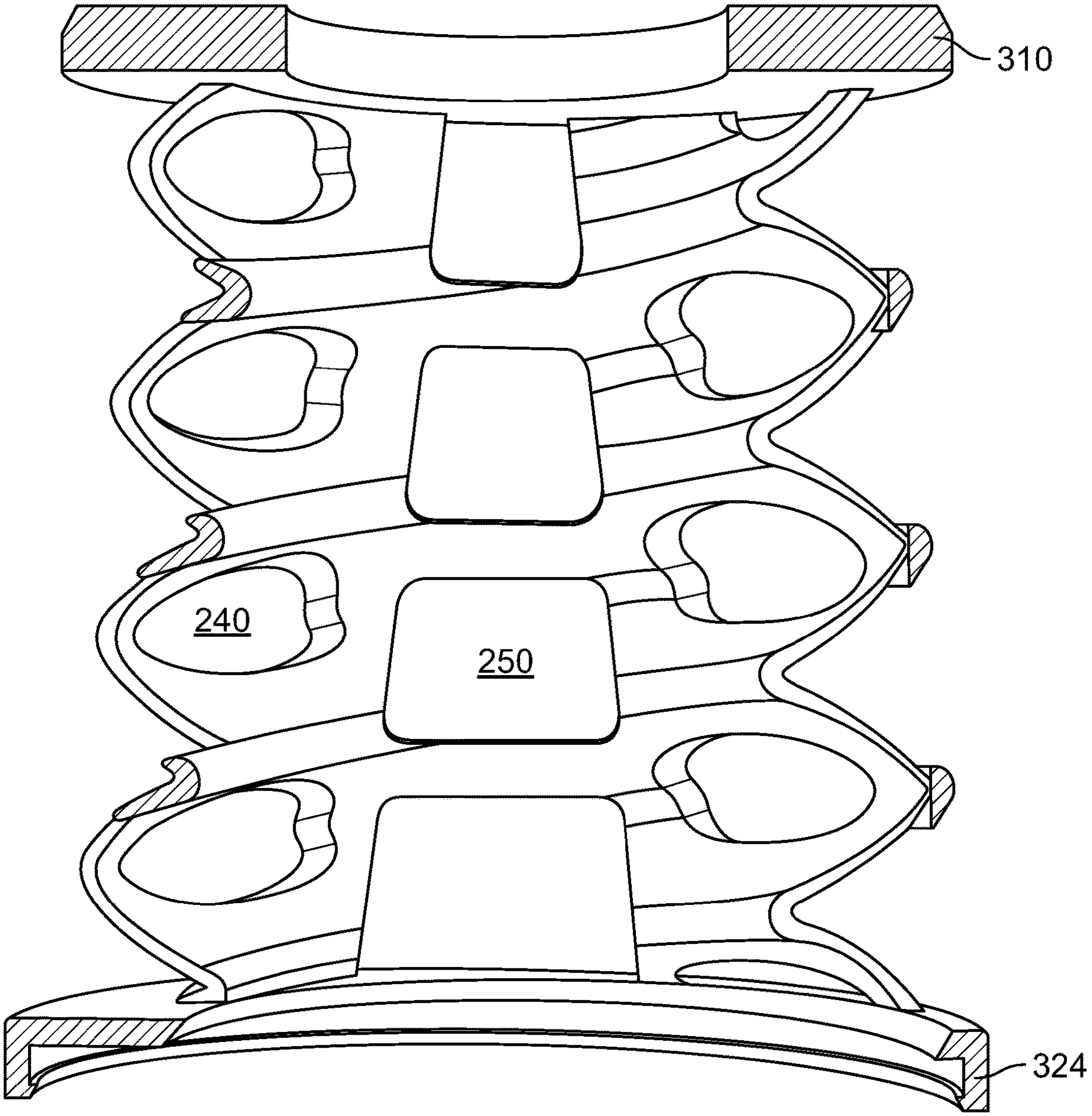

Operation of the invention may be better understood by reference to the detailed description, drawings, claims, and abstract-all of which form part of this written disclosure. While specific aspects and embodiments are contemplated, it will be understood that persons of skill in this field will be able to adapt and/or substitute certain teachings without departing from the underlying invention. Consequently, this disclosure should not be read as unduly limiting the invention(s).

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

U.S. Pat. No. 10,549,299 and United States Patent Publication 2018/0318861, along with Patent Cooperation Treaty Application Nos. PCT/EP2020/070871 and PCT/EP2020/070878, all disclose various designs and components of/for dispenser pumps that can be constructed completely from polymeric and recyclable materials. These disclosures are all incorporated by reference as if fully reproduced herein and, thereby, inform and supplement this disclosure with respect to materials selection, construction, processes, and various other aspects of this disclosure and any claims based thereon.

One distinction with these designs relates to the spring mechanism. Specifically, these designs all rely on iterations of a cylindrical wall with a resiliently deformable, segmented top panel. When axial force is applied and released along this top panel, fluids may be sucked into the interior void defined by the cylinder/panel combination. While this arrangement works quite well, its geometry dictates a comparatively flat, elongated, disc-like shape that may be difficult to incorporate into commonly used reciprocating pumps in which a metallic coil compression spring is seated around a reciprocating stem (for one example, see U.S. Pat. No. 8,827,121). When these springs are used, it is possible to reduce the diameter of the coil without sacrificing spring force and suctioning power. In turn, the reduced diameter makes the spring and pump combination suitable for use on the narrow-necked containers (i.e., 28 mm, 33 mm, and 38 mm neck diameters) that are most prevalent and preferred within the consumer market.

Previous attempts to incorporate the conventional bellows-style spring into these narrow-necked designs were not entirely successful. The arrangements disclosed above are not capable of producing sufficient, reliable spring/suction force within the footprint required by many of the existing and preferred pump and container neck sizes. Most of these arrangements also required a "stiffening rib" and fully formed, convex walls, all of which required additional materials and may have contributed to the undesirable performance characteristics (in terms of sustaining prolonged and sufficient spring/suction force). Aesthetically, the bellows proved to be difficult to incorporate within a housing, as this sort of concealed spring design that is used in numerous pump designs that rely on a metallic coil spring.

The inventor has now discovered, by reconfiguring the shape and comparative wall thickness of the bellows-style element, it becomes possible to create an-plastic biasing member that can be used in narrow-necked and/or conventional reciprocating pumps where the biasing member is fitted around an extending and retracting stem. This arrangement avoids the need to rely on the walls of the bellows to serve as part of the flow channel.

The design itself entails a frusto-conical, circular cylinder in which imaginary, offset, concentric helical traces serve as a characterizing feature. In particular, an outer helix trace is offset by about 180 degrees from an inner helix trace. Both traces have a smaller diameter at the top of the shape in comparison to the bottom, and the pitch of each trace is complimentary so as to retain a consistent shape along the entire axis (note that "axis" refers to the imaginary line running vertically through the cone/cylinder). Notably, a stiffening rib is not formed and, instead, each trace is regularly and periodically interrupted by or formed adjacent to perforations, as described below.

Wall sections are provided along and between portions of these outer and inner helix traces. However, a pattern of perforations are provided so that the wall does not and cannot serve as a fluid barrier (i.e., the biasing member is not a conduit for fluid, as can be found in some of the conventional all-plastic designs described above).

Further, the thickness of the wall forming these sections is regularly and deliberately reduced along selected facings. For example, assuming that the holes and apertures below are not yet formed in the cylinder/cone, one or more channels (preferably, two or four opposing one another) are provided in the wall sections in which the holes and/or apertures are formed (see below). These channels run vertically down the facings on which they are disposed, with the inner surface preferably remaining flush (i.e., so that the channel is visible along the exterior). Also, the channels are preferably spaced apart regularly and/or equally, with a portion of the thinned section overlapping with one or both sets of axially-aligned perforations.

Specifically, a series of axially aligned curved-, curvilinear-, circular-, or oval-shaped holes are formed, preferably along 2, 3, 4, 5, 6, 7, or 8 equally spaced arc segments of the cylinder/cone. A separate set of polygon-shaped apertures (e.g., trapazoids, squares, triangles, rectangles, curivlinear equivalents, etc.) are separately interspersed/positioned between these holes, preferably along the same number of arc segments. This arrangement insures that both of the outer and inner helix traces will be interrupted by a hole or aperture, although the inner helix trace may be situated adjacent to an edge of each aperture. Similarly, when present, the thinned channels will bisect the hole and/or apertures, with the inner helix trace traversing the solid portion of that channel. Collectively, these holes and apertures may be referred to as separate sets of axially-aligned perforations.

Each set of axially aligned perforations gets progressively larger moving down from the top of the cylinder/cone. That is, at least one of the length, width, radius, and/or diameter of the selected shape (hole or aperture) gradually increases. Thus, in a selected set disposed within an arc segment, the total surface area of the perforation (hole or aperture) closest to the top will be smallest, and the area will increase to a maximum in the perforation closest to the bottom. However, in some aspects, the holes may retain the same surface area and/or the apertures may also remain constant.

In this manner, a continuous, perforated wall surface is formed from the top to the bottom of the cylinder/cone. However, only a select number of arc segments on the cylinder/cone include vertically aligned wall sections extending continuously from top to bottom. Similarly, only those sections positioned vertically between the apertures define horizontal support members, while the corresponding sections positioned between the holes define pitched, slanting, or diagonal support members. Notably, the continuously vertically aligned sections have a diameter corresponding to either the outer helix trace (as illustrated in the Drawings) or the inner helix trace, such that the pitched support members correspond to the other trace (e.g., the inner helix trace, as illustrated in the Drawings).

This configuration of helix traces and wall sections impart a "corrugated but perforated" arrangement to surface to the biasing member. Notably, this arrangement is such that both the outer and inner helix traces are interrupted by perforations (i.e., do not include only solid wall as they spiral along the cylinder/cone). Also, both the outer and inner helix will have an increasing radius (as measured from the center point/central axis of the cylinder/cone). However, in a preferred aspect, the minimum radius of the outer helix trace is equal to or greater than the maximum radius of the inner helix trace. Also, the pitched support members are interspersed radially above and below the horizontal supports, while a defined number of vertical supports (two times greater than the number of sets of apertures, e.g., 8 vertical supports for 4 sets of apertures) connect these pitched and vertical supports while defining edges of both the holes and apertures.

Finally, separate flanges provide flattened interfaces at the top and bottom of the cylinder/cone. These interfaces may include recessed shapes, separated/defined by radial ribs and inner and outer circular walls at the top. The bottom can include an axially extended flange or sidewall, into which notches or coupling formations are provided on an outer and/or inner radial facing, with the notches aligned vertically with the central axis of the cylinder/cone. These top and bottom flanges, and any other shapes or features provided therein, can secure the spring within the broader pump, as described below.

This corrugated but perforated arrangement creates sufficient resilience and biasing force while also reducing weight and materials usage. Without intending to be limited by a theory of operation, the absence of material in the inventive biasing member allows for the user to more easily compress the spring, in comparison to conventional solid bellows in which the volume of solid material is more difficult (if not impossible) to compress as fully. Notably, the specific arrangement of vertical, pitched, and horizontal members ensures the biasing member will return to its original shape without rotating or twisting to such a degree that the biasing member itself is compromised in some way (fractured members, displaced from its original positioning, etc.).

The biasing member described above can be injection molded from a single polymeric material, similar or identical to the remaining components. Polypropylene, polyethylene, and other compatible and/or similar recyclable polymeric resins are particularly useful.

With respect to the helical nature of the biasing member, the depiction of a specific chiral configuration is not intended to be limiting. Thus, left-handed and right-handed helices are possible, so long as the inner and outer helical traces remain complimentary (i.e., both run in the left-handed or right-handed direction).

Turning now to FIGS. 1-5B, biasing member 100 has a generally cylindrical shape, with sidewall section 200 conforming approximately to a frusto-conical surface. Flanges 300, including top 310 and bottom 320, define the top and bottom edges of the member 100. The cylinder itself includes central axis C-C.

The flange 310 may include radial ribs 312 and inner and outer radial walls 314, 316. Together these features define distinct and possibly repeating shapes 318 (e.g., as shown, curved trapezoids) within the horizontal surface of the flange 310.

Flange 320 may include an axially extending wall 322. On at least one facing (inner or outer) of wall 322, spaced apart channels or notches 324 are formed.

While the features 312, 314, 316, 318 are associated with flange 310, it will be understood these could be disposed on flange 320. In the same manner, features 322, 324 could be incorporated onto flange 310. In some aspects, wall 324 could coincide with radial wall 318 so that all of the aforementioned features are provided to one or both flanges 310, 320.

As noted above, thinned wall sections 210 run the axial length of section 200. Outer helix trace 220 spirals around section 200 at a complimentary pitch (i.e., the angle of the trace relative to an imaginary horizontal plane of section 200) to the inner helix trace 230. Holes 240 and apertures 250 are provided in axially aligned sets (four in each set, as shown) so as to interrupt helix 220, while helix 230 passes along an edge of apertures 250. The holes 240 have an oval shape, while the apertures 250 are provided as trapezoids, although these may be collectively referred to as "perforations."

The continuous wall formed within section 200 includes horizontal members 260, pitched members 270, and vertical members 280. Generally speaking, the vertical members 280 will include a straight line of continuous solid material aligned along line 282-282. The positioning of members 260, 270, 280 also serves to define the perforations 240, 250.

Figure 4:
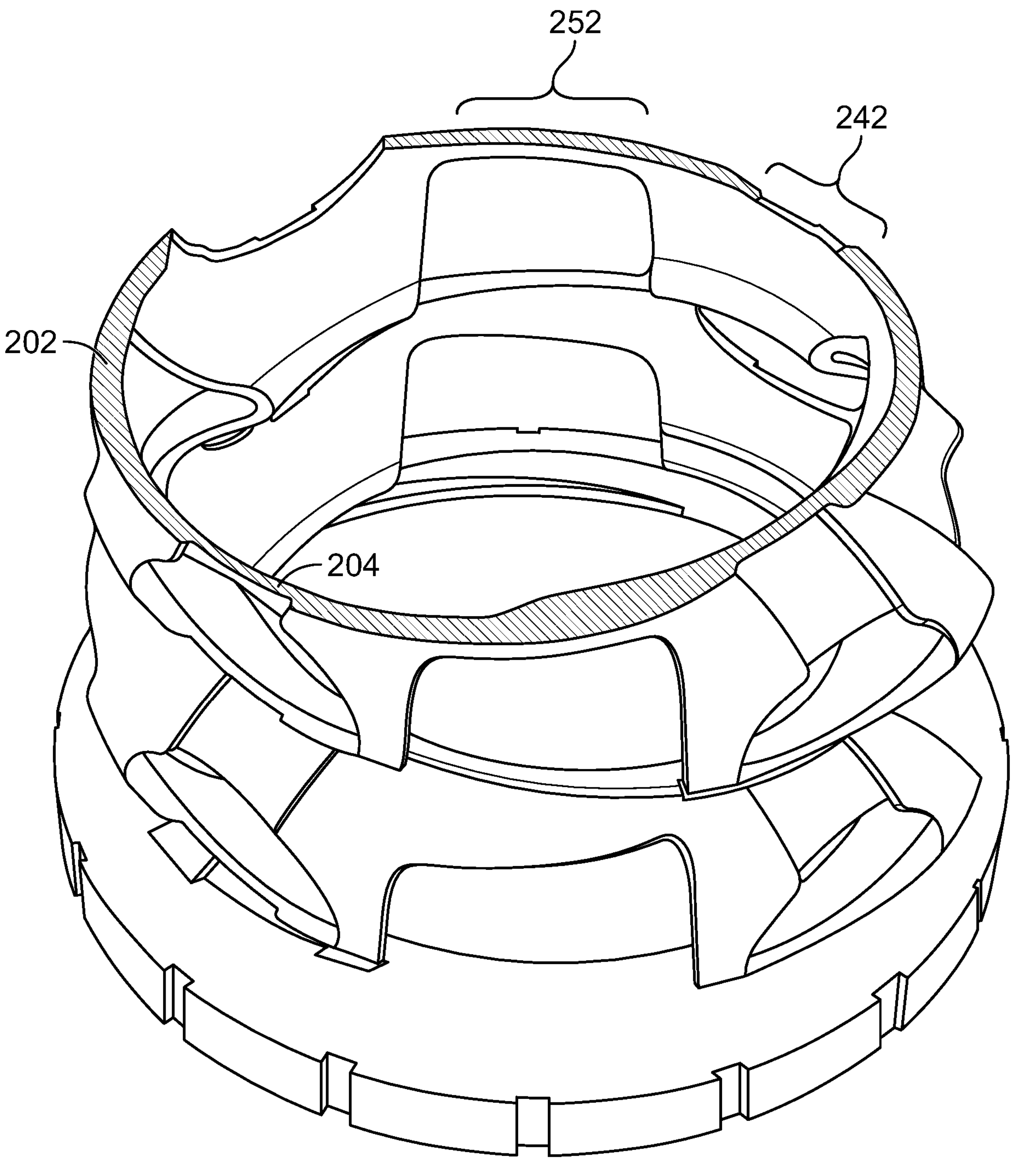
FIG. 4 is a three dimensional perspective cross sectional view taken near the midpoint of the central axis of the biasing member shown in FIG. 1, thereby highlighting the axial channels having decreased wall thickness in comparison to the other wall sections within that same plane.
Figure 5A:
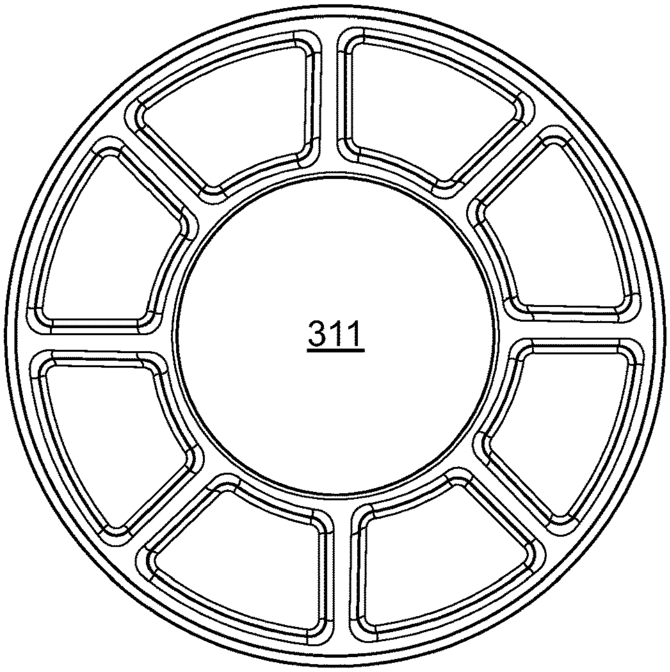
FIG. 5A is a top plan view and FIG. 5B is a bottom plan view, both of the biasing member shown in FIG. 1.
Figure 5B:
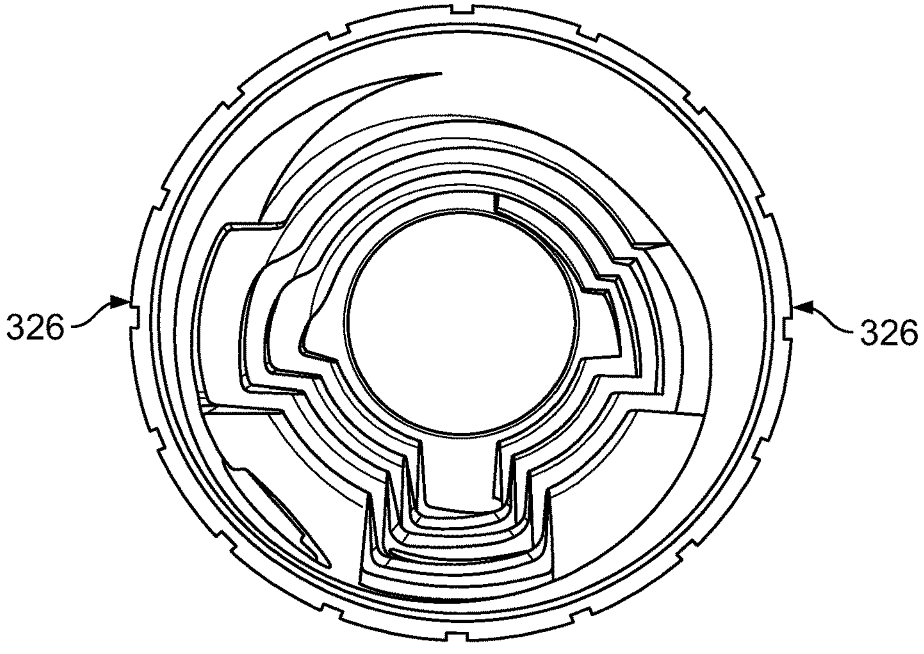
Figure 6A:
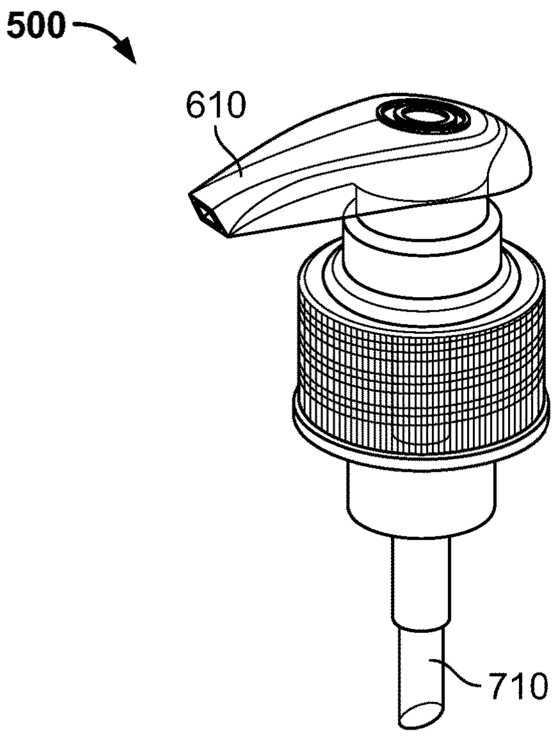
FIG. 6A is three dimensional perspective view of a reciprocating pump including the biasing member shown in FIG. 1, with FIG. 6B being a partially quartered cross sectional view (but retaining a complete, non-cross sectional view of the biasing member and stem) and FIG. 6C being a fully quartered cross section a view (such that the biasing member and stem are shown in quarter cross section) thereof.
Figure 6B:
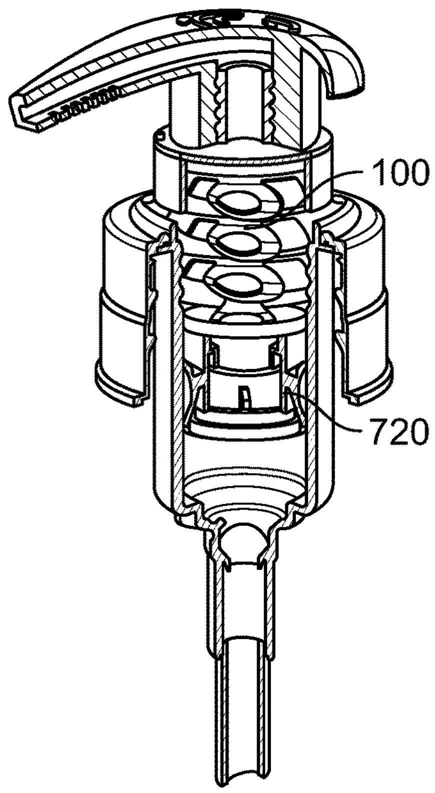
Figure 6C:
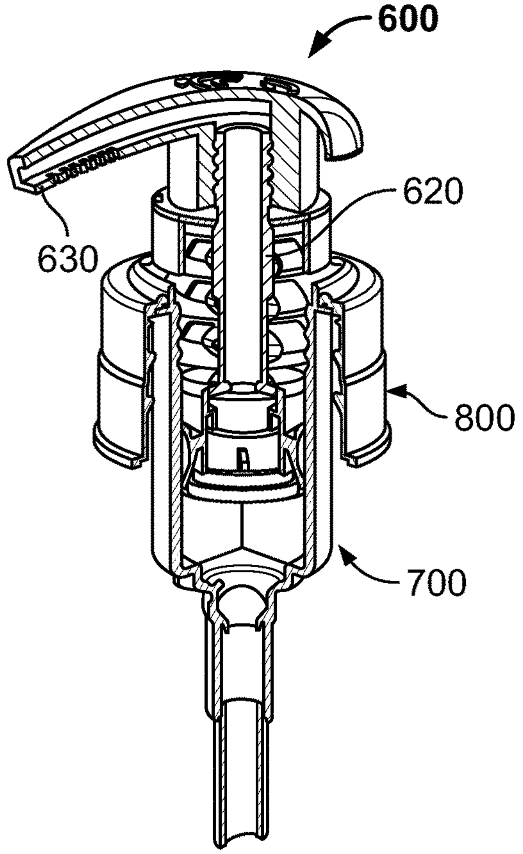

The channels 210 are best illustrated in FIG. 4. Here, the thicker wall sections 202, found in portions of members 260, 270, 280, are contrasted by the thinned wall sections 204. These thinned sections 204 align with holes 240 as shown, although it is possible to form channels 210 to align with apertures 250.

FIG. 4 also depicts how the sets of holes 240 and apertures 250 alternate along the surface of section 200. In this arrangement, each set is disposed on a corresponding arc section 242, 252 of the wall 200. Preferably, an equal number of sets of holes 240 and apertures 250 are provided, although arrangements can provide for combinations in which one more or one less set of holes 240 are provided relative to the number of sets of apertures 250. Notably, in order to sustain and define the members 260, 270, 280, each arc section 242, 252 is discrete and does not substantially overlap. Nevertheless, in some embodiments, it may be possible to provide the sets along a slightly spiraling path traversing the axis C-C.

Notably, biasing member 100 includes an aperture 311 having an inner diameter that will cooperate with the pump stem described below. The inner diameter taken along line 326-326 at the bottom of the member 100 will be larger than the inner diameter of aperture 311. In some aspects, the inner diameter along 326-326 will also be larger than the outer diameter of the flange 310 itself.

Figure 8A:
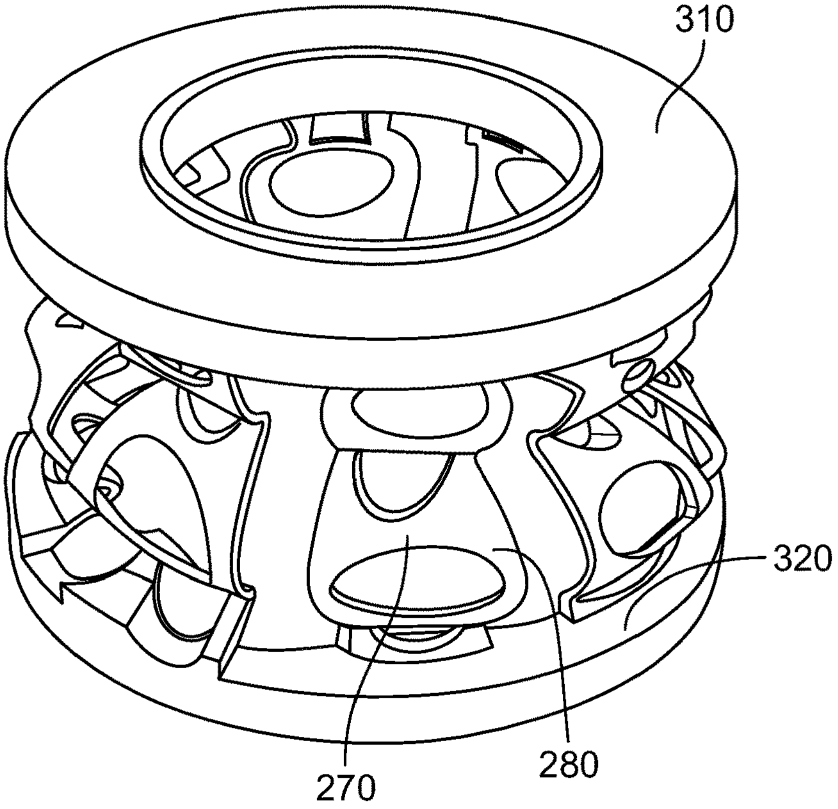
FIG. 8A is a three dimensional perspective view of a truncated biasing member appropriate for use in reciprocating pumps according to certain aspects of the invention, with FIG. 8B being a front perspective view of an axially bisected half of the biasing member of FIG. 8A (i.e., the half in the background has been removed), thereby highlighting the variable shapes of the holes and the elongated aperture.
Figure 8B:
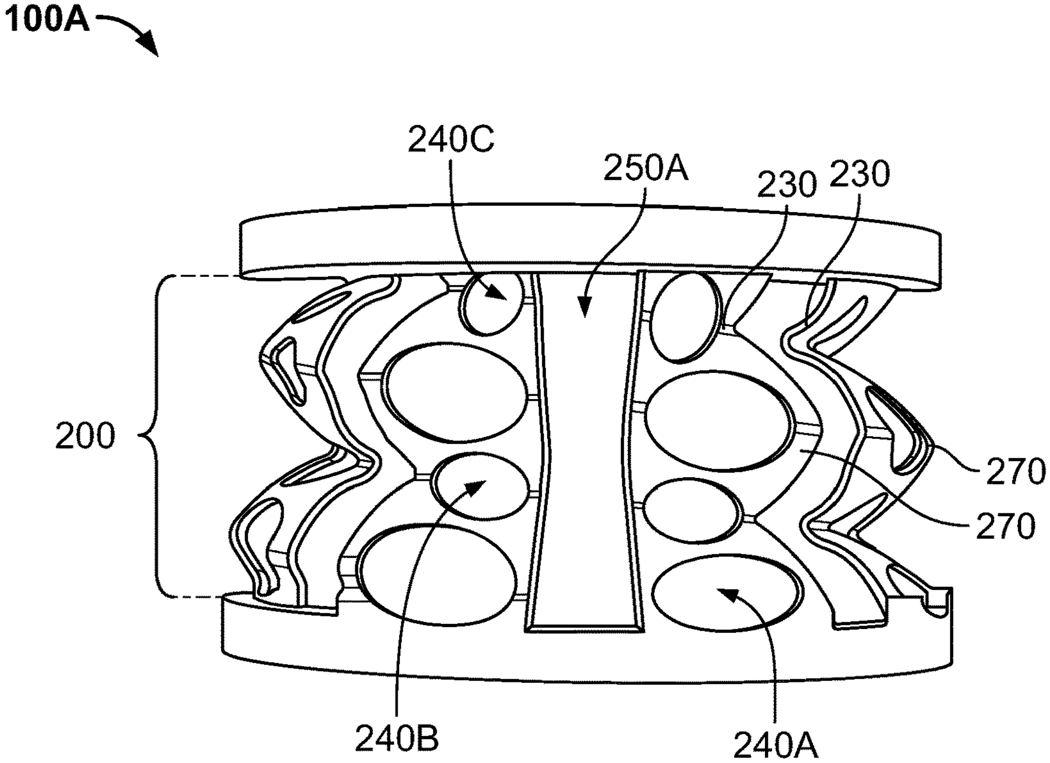

An alternative arrangement for the biasing member is illustrated in FIGS. 8A and 8B. Here, the outer and inner helix traces 220, 230 remain on biasing member 100A. However, no thinned channels are not needed. Instead, the aperture 250A runs the length of wall section 200. Additionally, a plurality of differently shaped holes 240A, 240B, 240C are provided. These holes may be of different shapes and sizes, with the three shown in FIGS. 8A and 8B merely being exemplary and not limiting. Also, the holes and apertures can have all of the same traits as described with respect to biasing member 100 above.

Notably, the biasing member 100A retains pitch members 270 and vertical members 280 as contemplated above. However, the flanges 310, 320 may provide the vertical support to define the apertures 250A. Also, the holes 240A, 240B, 240C are aligned along a common axis or spiral trace within the wall section 200; however, their differing sizes means that they may not as uniformly arranged as those shown in biasing member 100 of FIGS. 1 through 5B.

Other common features between biasing members 100 and 100A include interruptions (by way of the perforations) along the outer helix trace 220 and the comparative diameter/radius characteristics of the traces 220, 230. Although not shown in FIGS. 8A and 8B, biasing member 100A may also include the interfacing formations (e.g., ribs, radial walls, notches, etc.) on the flanges 310, 320. Generally speaking, this alternative arrangement delivers substantially all of the same benefits as described above, excepting that the comparative diameter and axial height of biasing member 100A is not as pronounced (or important) as that of biasing member 100 (which is anticipated as a direct substitute for metallic coil springs in any number of dispensing pump designs).

With further reference to FIGS. 9A to 10, yet another aspect of a series of all-polymer biasing members 100B are contemplated. These configurations, including but not limited to stacks X, Y, Z, are particular amenable to adoption in a standardized dispenser pump engine, as described below. However, the biasing member itself is provided as a plurality of modular units M that are stacked on top of one another in a particular pattern so as to allow for adjustment of the spring force and resultant dispensing capabilities of the biasing member and dispensing pump. Specifically, the orientation of modular units M is adapted to adjust the height and compression stroke of the overall biasing member X, Y, Z. These adjustments impact the spring force delivered by the entirety of the stack, thereby enabling mass production of a single unit M while still retaining flexibility to adapt the stack to meet the specific performance needs of fluids/dispensing pump (described below). Notably, the changes in axial height are small enough to allow any one of stacks X, Y, Z (or the others contemplated herein) to introduced into the dispensing pumps below without further alteration to the pump design or the modular unit itself.

Modular unit M has a frusto-conical shape and helices as described for biasing members 100, 100A above. In order to form a modular biasing member 100B, a plurality of units M are stacked and coupled to one another relying upon coupling features provided on flanges 310 and 320.

Each modular unit M in the stack abuts the others in a nested relationship (stack Z), in an abutting relationship (stack X), or in a mixed relationship (stack Y). In a nested relationship, the narrow ends of the unit M are aligned in the same direction, while in an abutting relationship, no such nesting is permitted. The mixed relationship contemplates a combination of at least one abutting set of units and one nesting set of units.

In the modular units M, flange 320 (at the wider end) includes an axially extending wall 322 having an inner diameter that is greater than the outer diameter of the flange 310 (at the narrow end). Notches or other features 324 (e.g., bead and groove, slot/bayonet, snap-tabs, etc.) can be provided to cooperate with corresponding beads or projections on flange 310 so that when the modular units M are all nested within one another (as described below), these coupling features secure the units to one another and inhibit unwanted rotation or decoupling. Alternatively, features 324 are provided on a top facing of the flange 320 so as to be received by a horizontal facing of the flange 310 (e.g., on the outer wall 316, within the repeating shapes 318, etc.).

A ledge or stop formation can be included in the wall 322 to prevent the abutting/nested unit from advancing too far into the stack. Notably, because the modular units are all identical, the inner diameter defining aperture 311 remains constant, so as to allow the biasing member 100B to be incorporated into pump designs just the same as members 100, 100A.

In the abutting relationship, the interface is formed between flanges 310 or flanges 320. Thus, additional features 324 and/or on any of features 312, 314, 316 can be designed with coupling arrangements the interface along the horizontal plane/abutment.

The net result of these varying positions is best illustrated in FIGS. 9A and 9B. Generally, each modular unit has a nominal height of H. The abutting stack will have an axial height of S1 (with the stack height equal to n×H, where n is the number of units in the stack), whereas the nested stack will have a smaller axial height of S2 (with the stack height being less than n×H). This difference amounts to a shorter stroke length for the nested stack means that it will generate less spring force and less suction. A mixed stack (where n≥3) will generate comparatively more force and suction, while fully abutting stacks will create the most force and suction.

These differences in spring force and suctioning capability (which can also translate into larger volumes of dispensed doses) enable a dispenser pump manufacturer to fine tune and improve the performance of the pump without requiring the manufacture of additional/different parts. Instead, the manufacturer simply needs to change the orientation of the modular units M or, additionally/alternatively, add or subtract units as needed/desired.

FIG. 10 illustrates how this modular concept can be expanded by increasing the number of units M within the stacks X, Y, Z. As the number of units M increases, the axial travel length X1, Y1, Z1 (relative to a common baseline B) can be tailored even more specifically. Still more units can be added to further increase the range of spring force, suction, etc.

Thus, in addition to the unique structure created by biasing member 100B, another aspect of the invention relates to a method of manufacturing a dispenser pump. Specifically, an actuator head with a stem and a pump engine are separately provided. A plurality of modular spring unit are interposed between the actuator head and the pump engine. The orientation of each modular spring unit is then adjusted to increase or decrease spring force and pumping characteristics of the dispenser pump. In some aspects, one or more modular spring units may be added or removed. All of the modular spring units are substantially identical and have the physical characteristics as described herein.

As indicated above, the coupling features can be reversed so that the axial wall is part of flange 310 and flange 320 presents with a horizontal surface. It is also possible to design stacks of modular units M based solely on the nesting relationship, without the need for additional coupling features.

Notably (and as shown in FIGS. 9A through 10), the modular units do not necessarily require the perforations described above. While the size and the shape of the holes affords the designer latitude to develop an all-polymer spring with sufficient flexibility and spring force, the modular approach can be complimentary or substituted for the perforations. The key features to incorporating any polymeric spring according to the invention here in are: the inner and outer helix traces creating a frusto-conical shape and the upper and lower flanges, including cooperating engagement features to enable the easy and reliable assembly of a stack of units M.

Finally, this modular approach allows a pump designer to consider all polymer pump designs in which the number of modular units M (and more specifically, the cumulative height of all those units) can enable biasing member 100B to replace a metallic coil spring in just about any reciprocating pump design. Further, the need for greater or lesser spring force can allow for that designer to select and fine tune the number of perforations in members 100, 100A to allow for broader design ranges. It is also possible to mix-and-match perforated and non-perforated biasing members, so long as they otherwise have the same footprint/dimensions.

In view of the foregoing, a reciprocating pump dispenser can be made entirely from recyclable materials, such as polymers, without the need for metal components. A pump body is coupled to a container, while an all-polymer biasing member disposed between the body and the actuator creates sufficient suction forces (upon actuation) in order to dispense fluid from the container. The biasing member is a hollow and cylindrical in shape, with two offset and congruent helical boundaries defining the contour of the member. Portions of that contour are defined by solid surfaces of varying thicknesses, with regular, intermittent, oval-shaped apertures formed along axes. In certain embodiments, these axes define a frusto-conical shape.

The biasing member, as described above, has outer and inner helix traces that rotate through more than 360° and, more preferably, more than 540° or 720° (i.e., one, one and one half, or two full turns) around the facing of the cylinder/cone.

The biasing member, either as a single unit or as a stack of modular units, is interposed between an actuator head and a pump body. The actuator head includes a dispensing nozzle which can be generally perpendicular to the axis upon which the pump engine reciprocates. The nozzle connects to a dispensing tube or stem which extends coaxially into the pump body itself. The actuator also includes along its bottom facing a cooperating attachment that engages the top facing of the biasing member.

The pump body includes a cap, rotatably attachable to the container, an insert and a body cylinder. The insert and/or body cylinder are attachable to the cap, so that the entirety of the pump body remains stationary, relative to the reciprocal movement of the actuator head (as induced by the biasing member). The insert may include a cooperating attachment on its top inner facing to accommodate the bottom end of the biasing member. The insert is also partially and coaxially received in the body cylinder.

In turn, the body cylinder defines a pumping chamber. A movable piston forms a sliding seal with the inner facing walls of the hollow body cylinder. Separately, a plug element attaches to the stem and also moves within the pumping chamber in response to the reciprocal motion of the actuator head and stem, thereby varying the volume of the pump chamber. Because the plug element moves in concert with the stem whereas the piston, sufficient spacing is created on the down stroke to temporarily open an aperture in the plug element to allow fluid to pass through. In this manner, the plug element acts as an outlet valve for the pump chamber.

Notably, the pump engine is designed to encompass an uplocked position. Thus, the sealing interfaces are engaged, including radial force exerted by the plug element against the piston to seal the piston to the inner side wall of the body cylinder, when the pump is fully extended. A chamfer and/or set of ramps on a top facing of the insert or cap engages formations on the actuator head to ensure the actuator remains locked in the up position. Other arrangements for locking are possible.

The uplock position ensures that the biasing member will not encounter unnecessary stresses associated with being kept in a compressed position for extended periods of time. It is believed prolonged compressive stress can degrade the performance of the all-plastic biasing member described herein.

The remaining features of the pump relate to its basic function. For example, a dip tube ensures fluid can be drawn up from the internal volume of the container. An inlet valve, such as a ball valve, controls the flow of fluid into the pump chamber. The container is configured to couple to the pump body, usually by way of a threaded connection, so that the pump engages a corresponding set of features at or proximate to the container mouth. The container itself must retain the fluid(s) to be dispensed and possess sufficient rigidity and/or venting capability to withstand the pumping motions and attendant pressure differentials created by the structures disclosed herein.

While a conventional fluid dispensing pump is depicted, the biasing members contemplated herein are also well suited for use in foaming pumps and other dispensers. As one examples, the shortened biasing member 100A possesses appropriate dimensions for use in trigger sprayers. It will also enable a greater number of modular units M to be incorporated into a biasing member 100B, thereby affording a greater range of possible spring forces within a fixed axial height range (i.e., maximum of B-Y1 and minimum of B-Z1, both as shown in FIG. 10).

All components of the pump dispenser should be made of materials having sufficient flexibility and structural integrity, as well as a chemically inert nature. Certain grades of polypropylene and polyethylene are particularly advantageous, especially in view of the absence of any thermosetting resins and/or different, elastomeric polymer blends. The materials should also be selected for workability, cost, and weight. Common polymers amenable to injection molding, extrusion, or other common forming processes should have particular utility.

Figure 7A:
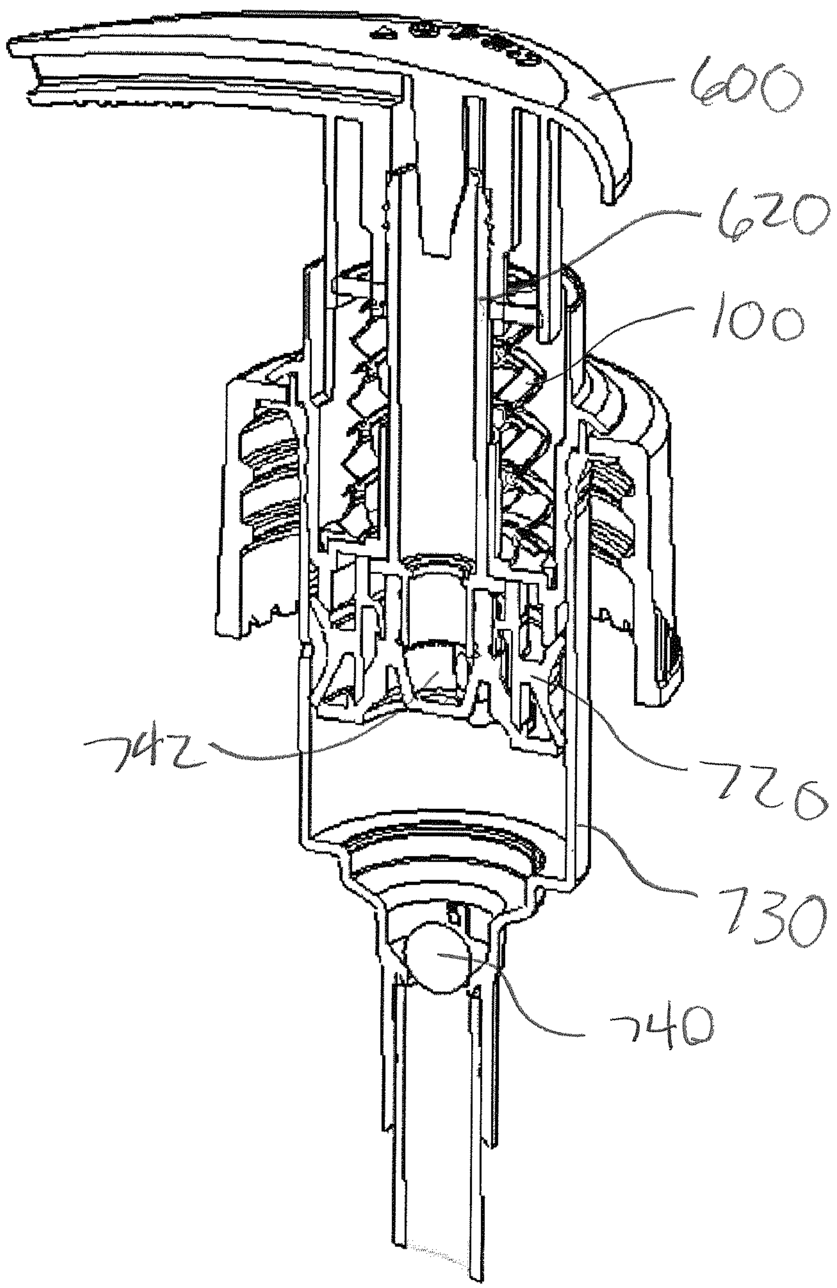
FIG. 7A is a cross sectional perspective view and FIG. 7B a cross sectional side view, both of the pump shown in FIG. 6A.
Figure 7B:
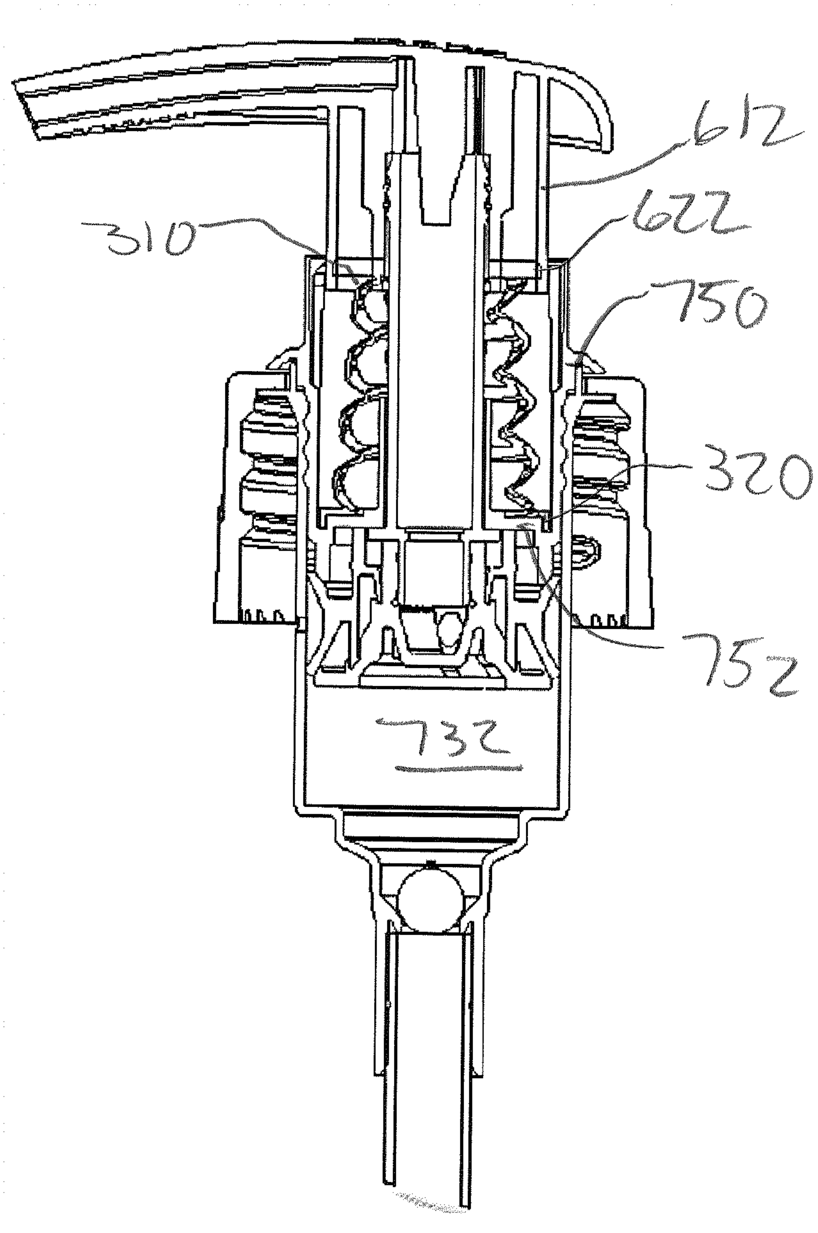

With reference to FIGS. 6A-7B, dispensing pump 500 includes an actuator 600 and pump body 700. Closure cap 800 is affixed to the cap 700 so that these components remain fixed to the container (not shown) to which the pump 500 is coupled. It should be noted that FIGS. 7A and 7B are specifically appropriate to a single biasing member or a stack of biasing members, as contemplated and described herein.

Actuator 600 includes head 610 which includes an outlet nozzle 630 for dispensed fluid. This fluid is delivered from the container and pump body 700 via hollow tubular stem 620. A skirt 612 may extend down from the head 610, with an engagement feature 622 provided in the skirt 612 and/or outer facing in the upper portion of the stem 620. Feature 622 couples to the flange 310 so that biasing member 100 (or 100A or 100B) urges the actuator 600 into an extended position (i.e., away from the fixed body 700 and closure 800).

The pump body 700 includes a cylinder 730 defining a pump chamber 732. The volume of chamber 732 is altered by actuation (i.e., downward axial force) applied to the head 610, with the biasing member 100 providing sufficient force to return the actuator 600 to its extended position. In doing so, valve 740 is temporarily displaced and fluid is drawn into the chamber 732. Upon subsequent actuation, fluid already in the chamber 732 is forced past valve 742, up through the hollow interstice of stem 620, and out of nozzle 630. Valves 740, 742 may be temporarily displaceable ball valves, flap valves, diaphragms, or other known structures.

The bottom flange 320 of biasing member 100 rests on a radial ledge 752 formed on a chaplet connector 750. Connector 750 affixes the body 700 to the closure 800. Connector 750 (or the interfaces of body 700 and closure 800) are formed so that vents and/or make up air passes freely therethrough so as to avoid pressure differentials between the sealed container and the ambient environment.

Ledge 752 also serves as an upper stop for piston element 720. Piston 720 slides axially within the cylinder 730 to alter the volume of chamber 732 (this requires the piston 720 to sealingly engage the inner facing of the cylinder 730). The lower edge of the stem 620 couples to or abuts the piston 720 so that both move downward upon actuation, while the resilience of biasing member 100 insures the actuator 600 returns to the extended position, pulling the piston 720 up with it. In this manner (and as described above), fluids are drawn through the dip tube 710 and eventually dispensed from the nozzle 630.

The closure cap 800 may include seals for venting and fluid containment, as well and coupling features (e.g., threads) to attach to a container neck. Notably, the arrangements in which biasing member are expected to have particular utility are those in which the pump 500 is designed to couple to a conventional, narrow-neck container. In such containers, the diameter of the neck (and therefore the maximum allowable diameter of the biasing member 100) is less than the expected axial travel length of the actuator 600. Stated differently, this means that the biasing member 100 must be axially compressible and still resilient along a length that exceeds the maximum outer diameter of the member 100 itself. In some arrangements, the axial travel may be 1, 2, or 3 times larger than this diameter.

References to coupling in this disclosure are to be understood as encompassing any of the conventional means used in this field. This may take the form of snap- or force fitting of components, although threaded connections, bead-and-groove, and slot-and-flange assemblies could be employed. Adhesive and fasteners could also be used, although such components must be judiciously selected so as to retain the recyclable nature of the assembly.

In the same manner, engagement may involve coupling or an abutting relationship. These terms, as well as any implicit or explicit reference to coupling, will should be considered in the context in which it is used, and any perceived ambiguity can potentially be resolved by referring to the drawings.

A number of aspects and embodiments for the biasing member and pump include any combination of one or more of the following features:

an actuator having a stem;

a pump body configured to receive the stem;

a biasing member interposed between the actuator and the pump body to urge the actuator away from the pump body, the biasing member comprising a plurality of modular units arranged in a stack and each having a central aperture sized to coaxially receive the stem;

wherein each modular unit includes an upper radial flange, a lower radial flange, a wall section, a central aperture, and an outer helix trace radially offset from an inner helix trace, with both the outer helix trace and the inner helix trace spiraling round a central axis of the biasing member from a bottom edge to a top edge so as to impart a corrugated surface to the wall section;

wherein the upper radial flange of each modular unit is configured to be received in the lower radial flange, or to be abutted with the upper radial flange, of an adjacent unit in the stack;

wherein a minimum radius of the outer helix trace, as measured within a horizontal plane of the biasing member, is larger than a maximum radius of the inner helix trace in any horizontal plane of the biasing member;

wherein the outer helix trace remains offset from the inner helix trace at a substantially constant axial distance;

wherein the plurality of perforations regularly interrupt one or both of the outer helix trace and the inner helix trace;

wherein coupling formations are formed on a horizontal surface of the upper radial flange and/or the lower radial flange of each modular unit;

wherein the coupling formations include at least one of radially aligned ribs, an inner circular wall, and an outer circular wall;

wherein coupling formations are formed on a vertical surface of an axially extending wall from the upper radial flange and/or from the lower radial flange of each modular unit;

wherein the coupling formations include at least one of an axially extending sidewall, coupling formations formed in an outer facing of the axially extending wall, and coupling formations formed in an inner facing of the axially extending wall;

wherein cooperating, coupling formations are provided on the upper and lower flanges of each modular unit, the cooperating, coupling formations configured so that a lower flange from a first unit either nests in an upper flange of a second unit or abuts a lower flange of the second unit;

wherein two or three modular units are provided in the stack;

wherein all of the modular units are provided in a nested relationship or in an abutting relationship; and wherein three modular units are provided in the stack in a mixed relationship.

A variety of embodiments involving a method of adapting the spring force of an all-polymer biasing member dose size of an all-polymer dispenser pump are also contemplated, including any combination of one or more of:

providing a plurality of modular spring units, each spring unit having a central aperture, an upper radial flange, a lower radial flange, a central aperture, and an outer helix trace radially offset from an inner helix trace, with both the outer helix trace and the inner helix trace spiraling round a central axis of the biasing member from a bottom edge to a top edge so as to impart a corrugated surface to the wall section;

coupling the modular spring units so as to form a biasing unit having a specific and differing spring force dependent upon whether the modular spring units are arranged in a nest relationship, an abutting relationship, or in a mixed relationship; and positioning the biasing unit between a pump body and around a stem of an actuator head so as to urge the actuator head away from the pump body at a desired spring force.

Although the present embodiments have been illustrated in the accompanying drawings and described in the foregoing detailed description, it is to be understood that the invention is not to be limited to just the embodiments disclosed, and numerous rearrangements, modifications and substitutions are also contemplated. The exemplary embodiment has been described with reference to the preferred embodiments, but further modifications and alterations encompass the preceding detailed description. These modifications and alterations also fall within the scope of the appended claims or the equivalents thereof.

What is claimed is:

1. An all-polymer, reciprocating dispenser pump comprising:

an actuator having a stem;

a pump body configured to receive the stem; and a biasing member interposed between the actuator and the pump body to urge the actuator away from the pump body, the biasing member comprising a plurality of modular units arranged in a stack and each having a central aperture sized to coaxially receive the stem;

wherein each modular unit includes an upper radial flange, a lower radial flange, a wall section, a central aperture, and an outer helix trace radially offset from an inner helix trace, with both the outer helix trace and the inner helix trace spiraling round a central axis of the biasing member from a bottom edge to a top edge so as to impart a corrugated surface to the wall section; and wherein the upper radial flange of each modular unit is configured to be received in the lower radial flange, or to be abutted with the upper radial flange, of an adjacent modular unit in the stack.

2. The dispenser pump of claim 1, wherein a minimum radius of the outer helix trace, as measured within a horizontal plane of the biasing member, is larger than a maximum radius of the inner helix trace in any horizontal plane of the biasing member.

3. The dispenser pump of claim 1, wherein the outer helix trace remains offset from the inner helix trace at a constant axial distance.

4. The dispenser pump of claim 1, wherein a plurality of perforations regularly interrupt one or both of the outer helix trace and the inner helix trace.

5. The dispenser pump of claim 1, wherein coupling formations are formed on a horizontal surface of the upper radial flange and/or the lower radial flange of each modular unit.

6. The dispenser pump of claim 5, wherein the coupling formations include at least one of radially aligned ribs, an inner circular wall, and an outer circular wall.

7. The dispenser pump of claim 1, wherein coupling formations are formed on a vertical surface of an axially extending wall from the upper radial flange and/or from the lower radial flange of each modular unit.

8. The dispenser pump of claim 7, wherein the coupling formations include at least one of an axially extending sidewall, the coupling formations formed in an outer facing of the axially extending wall, and the coupling formations formed in an inner facing of the axially extending wall.

9. The dispenser pump of claim 1, wherein cooperating, coupling formations are provided on the upper and lower flanges of each modular unit, the cooperating, coupling formations configured so that a lower flange from a first unit either nests in an upper flange of a second unit or abuts a lower flange of the second unit.

10. The dispenser pump of claim 9, wherein all of the modular units are provided in a nested relationship or in an abutting relationship.

11. The dispenser pump of claim 9, wherein three modular units are provided in the stack in a mixed relationship.

12. The dispenser pump of claim 1, wherein three modular units are provided in the stack.

13. A method of adapting the spring force of an all-polymer biasing member dose size of an all-polymer dispenser pump, the method comprising: providing a plurality of modular spring units, each spring unit having a central aperture, an upper radial flange, a lower radial flange, a central aperture, and an outer helix trace radially offset from an inner helix trace, with both the outer helix trace and the inner helix trace spiraling round a central axis of the biasing member from a bottom edge to a top edge so as to impart a corrugated surface to the wall section; and coupling the modular spring units so as to form a biasing unit having a specific and differing spring force dependent upon whether the modular spring units are arranged in a nest relationship, an abutting relationship, or in a mixed relationship, and positioning the biasing unit between a pump body and around a stem of an actuator head so as to urge the actuator head away from the pump body at a desired spring force.

* * * * *